Patented Nov. 24, 1953

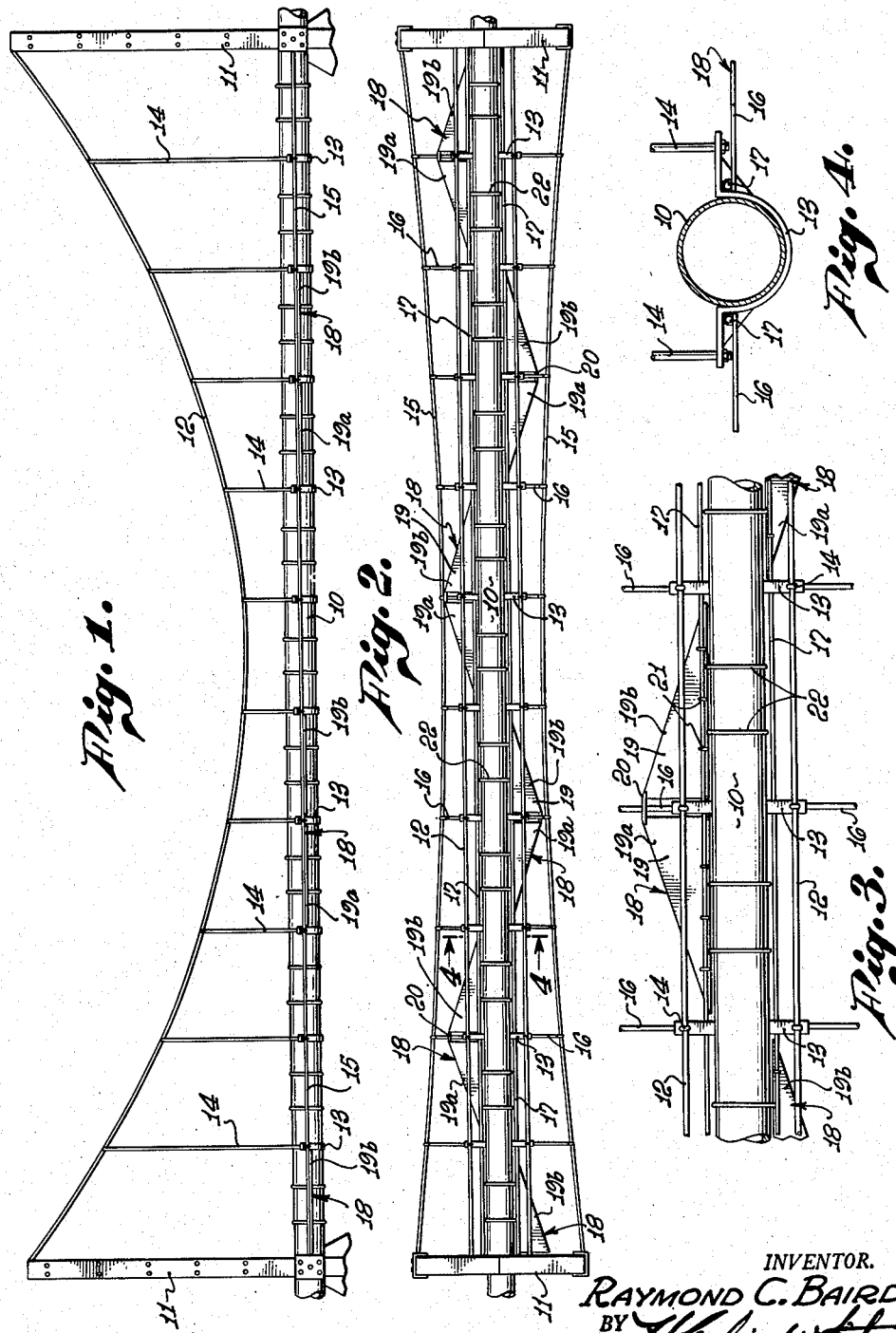

2,659,913

UNITED STATES PATENT OFFICE 2,659,913

STABILIZED SUSPENSION LINE

Raymond C. Baird, Los Angeles, Calif., assignor to The Fluor Corporation, Ltd., Los Angeles, Calif., a corporation of California Application November 7, 1949, Serial No. 125,965

7 Claims. (Cl. 14—19)

This invention relates generally to the stabilization of line structures suspended in the air and subject to vibration by transverse winds. More particularly, the invention is directed to the stabilization of elongated suspended lines of substantially circular cross-section, and among which suspended pipe lines, or pipe line bridges present vibration problems to whose solution the invention is especially applicable. Accordingly, the invention will be described specifically, though typically, in conjunction with pipe suspension bridges.

Careful observations made to determine the causes and nature of vibration of the pipe span, establish generally that such vibrations are produced by transversely flowing winds, and can assume frequencies or magnitudes endangering the pipe and its connections. Such conditions may exist, for example, in relation to a suspended section of gas distribution line bridges across a river.

It is found that whereas from a stationary condition, the pipe may start and continue to vibrate at increasing amplitude depending upon the magnitude of the transverse wind velocity, as evidenced by measurements indicating that the more serious vibrational conditions may be induced by a decrease in wind velocity. Vibration of the pipe appears to be induced by the approximate coincidence of the natural period of vibration of the pipe structure with the rate at which downwind eddies are formed by the aerodynamic interaction of the wind with the pipe. This effect is referred to in the literature as the von Karman Trail. The von Karman wind eddies alternate in direction of spin and with this alternation there is a corresponding alternating force acting on the pipe transverse to the incident wind direction. The rate of wind eddy formation and hence the alternating force acting on the pipe is given by the following equation:

$$F = k \frac{v}{t}$$

where $F$ = rate (frequency of eddy formation)
$k$ = constant of proportionality
$v$ = velocity of the incident wind
$t$ = thickness of the pipe in the direction of the incident wind My primary object is to prevent consequential vibrations of the pipe by the use of arrangements along the pipe of wind deflecting structures or baffles so as to produce one or the other of the following results: (1) A variation in effective wind velocity ($v$) along the pipe, thus minimizing the possibility of much energy being contained in wind eddies having a frequency sympathetic to the natural frequency of the structure. (2) A continuous variation in effective pipe width ($t$) thus minimizing the possibility of much energy being contained in wind eddies having a frequency sympathetic to the natural frequency of the structure. More specifically the invention contemplates the placement at one or both sides of the pipe, of a baffle arrangement forming with the pipe a structure of varying aerodynamic width ($t$), preferably by an alternating or staggered relation of the baffles, so as to give the structure such width variation as will prevent the formation or continuance of any serious eddy condition directed either transversely or longitudinally of the pipe.

While the invention may take different specific forms, I have shown in the accompanying drawing and will now proceed to describe a typical embodiment, from an explanation of which the features and objects referred to in the foregoing will be more fully understood. In the drawing:

Fig. 1 is a view showing an illustrative form of the stabilized pipe suspension bridge in side elevation;

Fig. 2 is a plan view of Fig. 1;

Fig. 3 shows a fragmentary portion of Fig. 2 at enlarged scale; and

Fig. 4 is a section on line 4—4 of Fig. 2.

It will be understood that in any specific instance the pipe span may be carried or supported by any suitable arrangement of overhead suspension cables. Merely as illustrative, the drawing shows a pipe span 10 extending between the bridge standards 11 carrying a pair of suspension cables 12. The pipe 10 is directly supported by spaced hangers or cradles 13 suspended on the vertical drop lines 14 connected to the cables 12. As illustrative of a lateral structure for supporting and maintaining the baffle series in position, I show a pair of cables 15 extending outwardly from the pipe at opposite sides thereof and terminally connected to the standards 11. These cables are connected to the pipe cradles 13 by the transverse lines 16. A second pair of cables 17 may be extended longitudinally of the pipe in relatively close relation and terminally anchored to the standards 11.

As best illustrated in Figs. 2 and 3, I mount at opposite sides of the pipe 10, a series of baffles generally indicated at 18 preferably in the form of horizontal and triangular vanes 19 arranged in pairs 19a and 19b so as to form together an outwardly convergent vane assembly of overall triangular shape. As will be observed, each assembly 19a, 19b at one side of the pipe is positioned in longitudinally offset or staggered relation to the adjacent corresponding assemblies at the opposite side of the pipe so that together with the pipe, the baffle vanes present a structure of longitudinally varying aerodynamic width, the effect of which as previously indicated, is to so affect the wind currents flowing transversely of the pipe, as to preclude the formation or continuance of such wind eddies directed either laterally or lengthwise of the pipe, as would otherwise tend to induce pipe vibration. The length of each baffle vane 19 may have any desired relation to the total length of the pipe span, although the vane dimension ordinarily will be relatively small. Typically as applied to a span of 30 inch pipe 1000 feet long, each vane 19 will have a length of about 30 feet.

The vanes 19 may be attached to the transverse cable system, and also if desired more directly to the pipe itself, in any suitable way. As illustrative, the adjacent ends of the vane pairs 19a and 19b may be connected at 20 to the laterals 16, and along their inner edges at 21 to the cable 17. Alternately or in addition, the inner edge portions of the vanes may be connected more directly to the pipe, as for example to the straps 22.

I claim:

1. The combination comprising an elongated pipe line of substantially circular cross-section suspended in the air so that the line is subject to the vibration-inducing tendencies of adjacent eddy currents produced by transverse winds, a flexible cable suspension system including cables attached to said line at spaced intervals, a series of baffles each baffle being of varying transverse width extending longitudinally of the line at the side thereof so that the baffles have spaced lateral edges, and means for supporting the baffles in parallelism with the line.

2. The combination comprising an elongated pipe line of substantially circular cross-section suspended in the air so that the line is subject to the vibration-inducing tendencies of adjacent eddy currents produced by transverse winds, a flexible cable suspension system including cables attached to said line at spaced intervals, two series of baffles each baffle being of varying transverse width extending longitudinally of the line at opposite sides thereof so that the baffles have spaced lateral edges, and means for supporting the baffles in parallelism with the line.

3. The combination comprising an elongated pipe line of substantially circular cross-section suspended in the air so that the line is subject to the vibration-inducing tendencies of adjacent eddy currents produced by transverse winds, a flexible cable suspension system including cable attached to said line at spaced intervals, a series of baffles presenting a succession of outwardly convergent edges and the series extending longitudinally of the line at the side thereof so that the baffles have spaced lateral edges, and means for supporting the baffles in parallelism with the line.

4. The combination comprising an elongated pipe line of substantially circular cross-section suspended in the air so that the line is subject to the vibration-inducing tendencies of adjacent eddy currents produced by transverse winds, a flexible cable suspension system including cables attached to said line at spaced intervals, two series of baffles each baffle being of varying transverse width extending longitudinally of the line at the opposite sides thereof so that the baffles have spaced lateral edges, the baffles of said two series being offset in staggered relation, and means for supporting the baffles in parallelism with the line.

5. The combination comprising an elongated pipe line of substantially circular cross-section suspended in the air so that the line is subject to the vibration-inducing tendencies of adjacent eddy currents produced by transverse winds, a flexible cable suspension system including cables attached to said line at spaced intervals, two series of baffles each baffle having outwardly convergent edges and extending longitudinally of the line at the opposite sides thereof so that the baffles have spaced lateral edges, the baffles of said two series being offset in staggered relation, and means for supporting the baffles in parallelism with the line.

6. The combination comprising an elongated line of substantially circular cross-section suspended in the air so that the line is subject to the vibration-inducing tendencies of adjacent eddy currents produced by transverse winds, a flexible cable suspension system including cables attached to said line at spaced intervals, a series of baffles each baffle being of varying transverse width extending longitudinally of the line at the side thereof so that the baffles have spaced lateral edges, and a cable paralleling and spaced laterally from said line supporting the baffles in parallelism with the line.

7. The combination comprising an elongated line of substantially circular cross-section suspended in the air so that the line is subject to the vibration-inducing tendencies of adjacent eddy currents produced by transverse winds, a flexible cable suspension system including cables attached to said line at spaced intervals, two series of baffles each baffle having outwardly convergent edges and said series extending longitudinally of the line at the opposite sides thereof so that the baffles have spaced lateral edges, the baffles of said two series being offset in staggered relation, and a cable paralleling and spaced laterally from said line supporting the baffles in parallelism with the line.

RAYMOND C. BAIRD.

References Cited in the file of this patent

UNITED STATES PATENTS

| Number | Name | Date |
|---|---|---|
| 629,935 | Sturgis | Aug. 1, 1899 |
| 1,592,685 | Schachenmeier | July 13, 1926 |
| 2,075,875 | Stulen | Apr. 6, 1937 |
| 2,221,919 | Kenan | Nov. 19, 1940 |